INVENTOR
ELMER B. BURNETT

Oct. 19, 1965        E. B. BURNETT        3,212,293

CENTRIFUGAL TYPE IMPULSE TOOL

Original Filed Dec. 12, 1962        5 Sheets-Sheet 2

INVENTOR
ELMER B. BURNETT

BY
ATTORNEY

Oct. 19, 1965  E. B. BURNETT  3,212,293
CENTRIFUGAL TYPE IMPULSE TOOL
Original Filed Dec. 12, 1962  5 Sheets-Sheet 3

INVENTOR
ELMER B. BURNETT
BY
ATTORNEY

Oct. 19, 1965     E. B. BURNETT     3,212,293
CENTRIFUGAL TYPE IMPULSE TOOL

Original Filed Dec. 12, 1962     5 Sheets-Sheet 5

INVENTOR
ELMER B. BURNETT

BY
ATTORNEY

United States Patent Office 3,212,293
Patented Oct. 19, 1965

3,212,293
CENTRIFUGAL TYPE IMPULSE TOOL
Elmer B. Burnett, Monroeton, Pa., assignor to Ingersoll-Rand Company, New York, N.Y., a corporation of New Jersey
Original application Dec. 12, 1962, Ser. No. 244,151. Divided and this application May 5, 1964, Ser. No. 377,793
12 Claims. (Cl. 64—26)

This application is a divisional application of U.S. Patent application Serial #244,151 filed December 12, 1962, by Donald K. Skoog et al. and entitled "Impulse Tool". The present invention relates to impulse tools of the type disclosed in U.S. Patent No. 3,116,617 issued January 7, 1964 to D. K. Skoog and on U.S. Patent application Serial No. 285,160 filed March 18, 1963 by D. K. Skoog, and more particularly to an improved impulse tool of the centrifugal type.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satify the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the prevent invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

A further object of the present invention is the provision of an impulse tool which is operable to apply a torque or a series of impulses at an angle with respect to the longitudinal axis of the impulse tool.

A still further object of the present invention is to provide a centrifugal type impulse tool which utilizes centrifugal force to form the impulsing seal thereby providing rapid sealing with attendant rapid impulsing.

For a better understanding of the present invention reference should be had to the accompanying drawings, wherein like numerals of reference indicate similar parts throughout the several views and wherein.

FIGURES 2, 3, 3a, 3b

Figure 2:
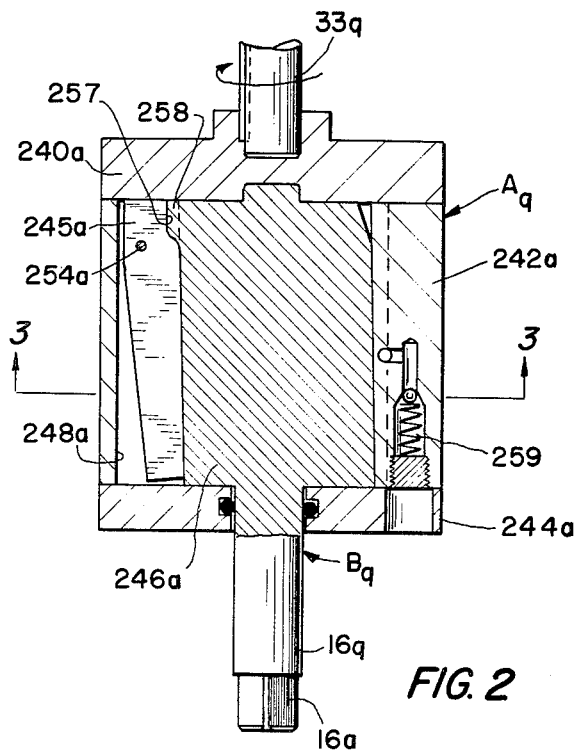
FIG. 2 is a view of an embodiment showing the housing means as the driven member.
Figure 3:
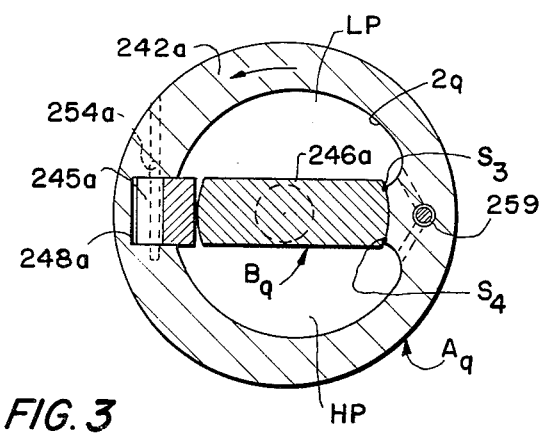
FIG. 3 is a vertical sectional view along the line 3—3 of FIG. 2 in the direction of the arrows.

Referring to FIGS. 2, 3, blade means, such as blade 245a (FIGS. 2, 3), is pivoted on the driven element (either housing means $A_q$ or spindle means $B_q$ in this case on housing means $A_q$) and held in open unsealing position by centrifugal force. Cam means, such as spindle cam 246a (FIGS. 2, 3), is carried by the other element or normally stationary element (i.e., spindle means $B_q$) and move the blade 245a to sealing engagement with the spindle cam 246a. The impulse is applied to the spindle cam 246a.

In the embodiment shown in FIGS. 2 and 3 the blade 245a is pivoted at 254a (FIGS. 2, 3) on the cylinder 242a (FIGS. 2, 3) and centrifugal force forces the blade 245a outwardly to the unsealed position as permitted by cut-out 257 (FIG. 2) on blade 245a, until such time as a cam surface 258 (FIG. 2) on the spindle cam 246a forces the blade 245a into sealing position shown in FIG. 3.

Figure 1:
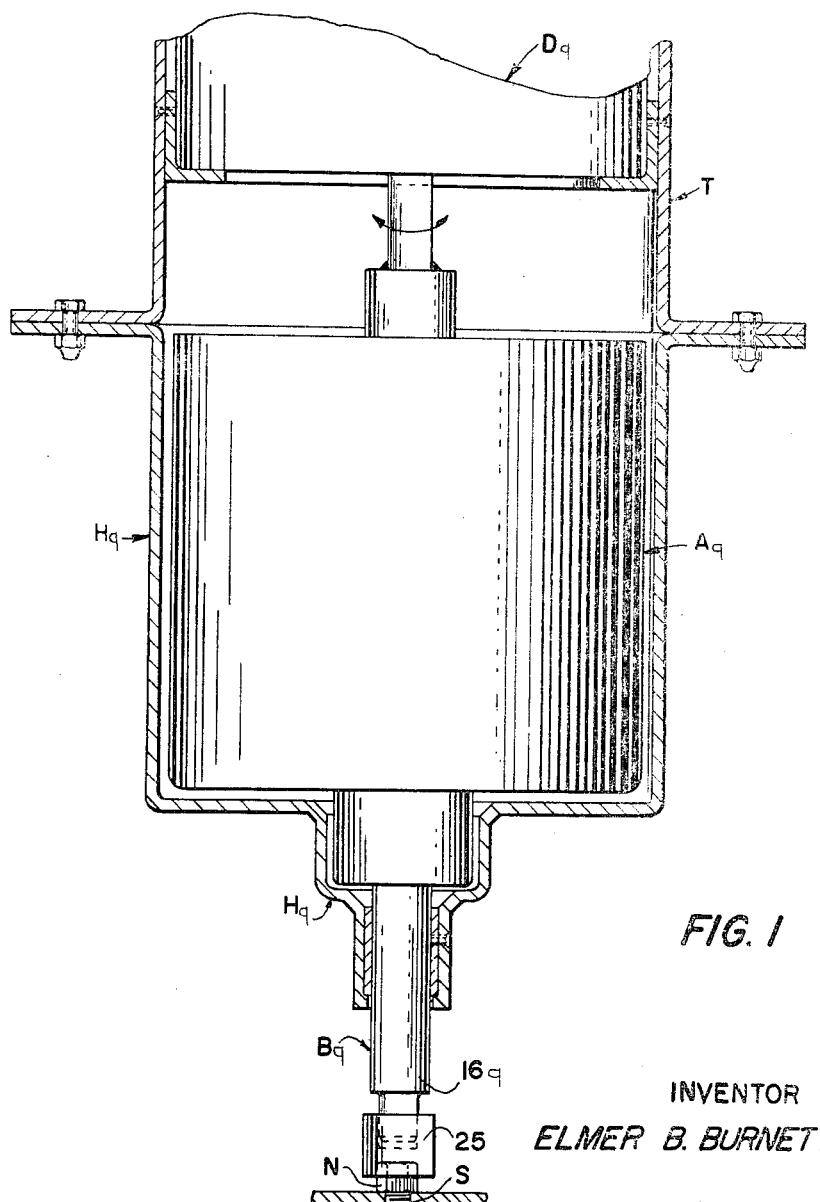
FIG. 1 is a side elevational view of the improved tool of the impulse type, shown in engagement with a threaded fastener and with a stationary casing means shown in vertical section.

Pressure relief means, such as the valve 259 (FIGS. 2, 3), permits the impulse tool to "kick out" when predetermined torque is achieved in the fastened N FIG. 1.

Figure 3A:
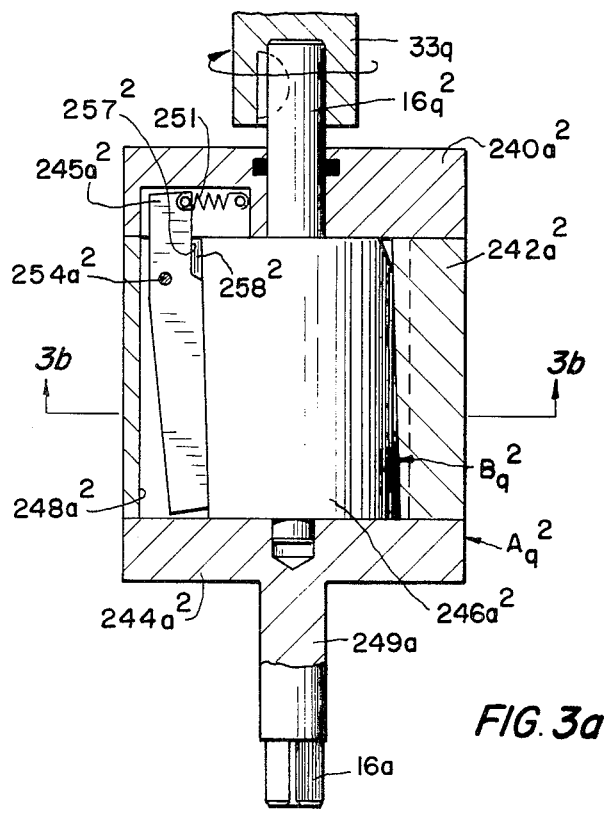
FIG. 3a is a view similar to FIG. 2 showing the spindle means connected to the output shaft of a drive means and the housing means being connected to a square drive for a fastener socket, the blade in the housing means being biased outwardly by a spring since centrifugal force on the blade has been eliminated in this embodiment.
Figure 3B:
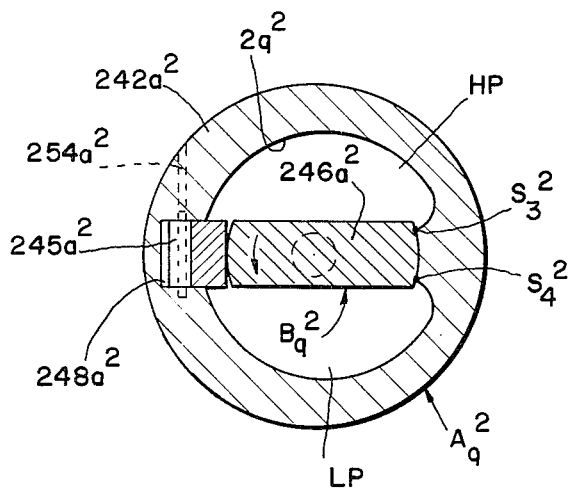
FIG. 3b is a horizontal sectional view along the line 3b—3b of FIG. 3a in the direction of the arrows.

As shown in FIGS. 3a, 3b the shaft $16_q^2$ of the spindle means $B_q^2$ is connected to the output shaft $33_q$ (FIG. 3a) of a drive means, such as an air motor similar to motor $D_q$ FIG. 1. The shaft 249a for the housing means $A_q^2$ is connected to a square drive 16a for a fastener socket similar to socket 25 FIG. 1. The blade $245a^2$ is biased outwardly by a spring 251 (FIG. 3a) since the effect of centrifugal force on the blade $245a^2$ has been eliminated in this embodiment.

The aforesaid objects of the present invention and other objects which will become apparent as the description proceeds are achieved by providing an impulse tool for applying a predetermined torque to an object. This impulse tool comprises housing means provided with a cavity adapted to contain a fluid, a spindle means rotatable in the housing means and in the fluid, and drive means connected to one of the housing means and spindle means for rotating the other of the housing means and spindle means with respect to the object. One of the housing means and spindle means is provided with a recess. Blade means are in the recess, pivoted on the one and held in the open unsealing position by centrifugal force. Cam means are carried by the other and are engageable with the blade means to force the blade means into sealing engagement with the other. Sealing means are in the one. The blade means and the other and the sealing means are operable during a relatively small portion of each revolution of relative rotary movement to dynamically seal off the cavity into a high pressure portion to impulse the other and the object.

Alternatively the centrifugal type impulse tool has blade means pivoted on the driven element (either the housing means or the spindle means) and the blade means is held by centrifugal force in the open unsealing position. Cam means is carried by the other element or normally stationary element and moves the blade means into sealing engagement with the cam means. Impulses are applied to the cam means.

Again the centrifugal type impulse tool has blade means reciprocable in the driven element (either the housing means or the spindle means) and is urged by centrifugal force against the driven element. Cam means are carried by the other element or normally stationary element and are operable to move the blade means into sealing engagement with the cam means, to which the impulse is applied.

With specific reference to the form of the present invention illustrated in the drawings, and referring particularly to FIG. 1, the impulse tool of the present invention (for applying torque to a nut N on bolt S by a socket 25) is indicated generally by the reference letter T.

As shown in FIG. 1 this impulse tool T has a housing means $A_q$ adapted to contain a fluid, such as oil F.

*FIGURES 4, 5, 5a, 5b, 6, 7*

As shown in FIGS. 4–7 blade means, such as the blade 245b (FIGS. 4, 5, 6, 7), is reciprocable in the driven element (either housing means $A_q$ or spindle means $B_q$) in this case the housing means $A_q$ and is urged by centrifugal force against the driven element or housing means $A_q$. Cam means, such as the cam 246b (FIGS. 4, 5), are carried by the other element or normally stationary element in this case spindle means $B_q$ and are operable to move the blade 245b into sealing engagement with the cam 246b, to which the impulse is applied.

Figure 4:
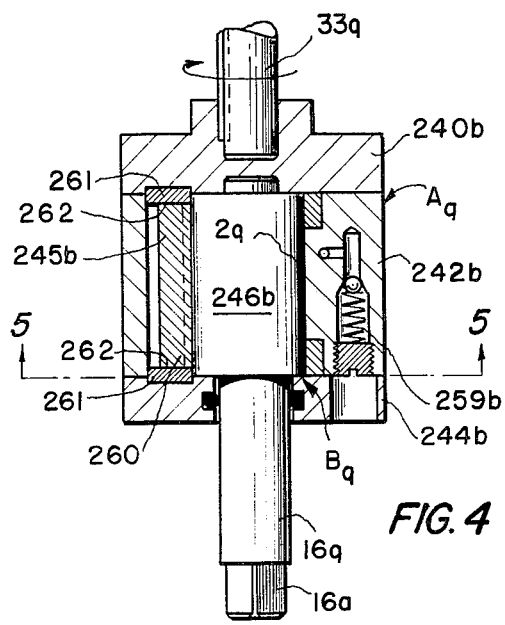
FIG. 4 is a view similar to FIG. 2 of a further alternative embodiment showing the housing means as the driven member.
Figure 6:
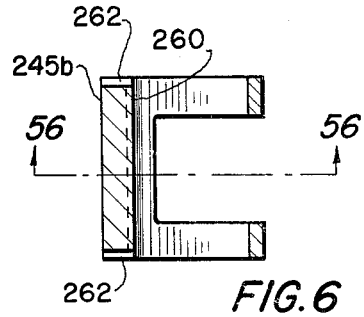
FIG. 6 is a side elevational view of the blade.
Figure 7:
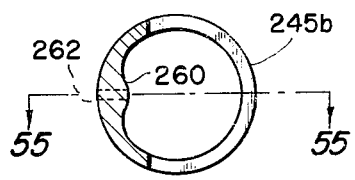
FIG. 7 is a vertical sectional view along the line 7—7 of FIG. 6 in the direction of the arrows.
Figure 5:
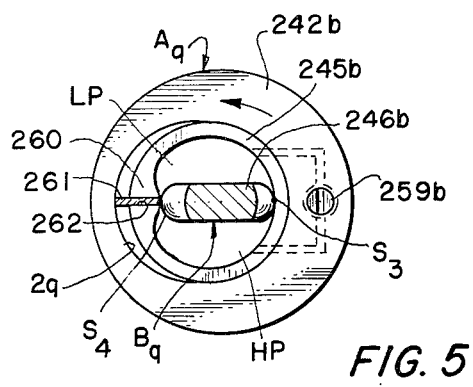
FIG. 5 is a vertical sectional view along the line 5—5 of FIG. 4 in the direction of the arrows.

In FIGS. 4 and 5 the heavy portion of blade 245b (FIGS. 6, 7), carrying the sealing lug 260 (FIGS. 4–7) is normally held by centrifugal force against the side wall of the cavity $2_q$ (FIGS. 4, 5). The spindle cam 246b retracts the blade 245b into sealing and momentary impulsing position shown in FIG. 5.

To prevent rotation of the blade 245b relative to the rotating inner housing $A_q$, keys 261 (FIGS. 4, 5) project from the end plates 244b (FIG. 4) and 240b (FIG. 4) into slots 262 (FIGS. 4–7) in the blade 245b.

Figure 5A:
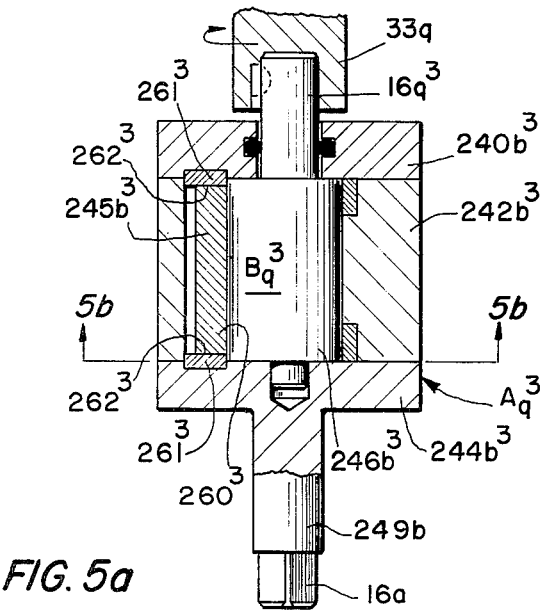
FIG. 5a is a view similar to FIG. 4 showing the shaft of the spindle means connected to an output shaft of a drive means and the housing means connected to a square drive for a fastener socket, the effect of centrifugal force on the blade being eliminated in this embodiment and the pressure relief means being eliminated for the sake of clarity.
Figure 5B:
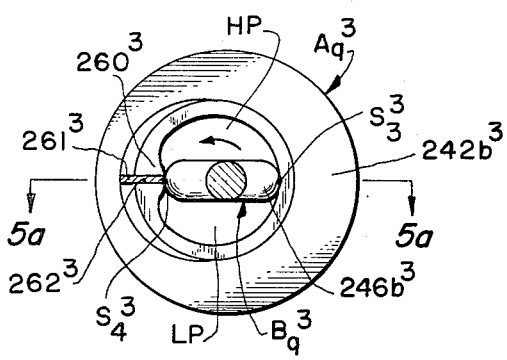
FIG. 5b is a horizontal sectional view along the line 5b—5b of FIG. 5a in the direction of the arrows.

Referring to FIGS. 5a, 5b the shaft $16_q^3$ (FIG. 5a) of the spindle means $B_q^3$ is connected to an output shaft $33_q$ of a drive means, such as an air motor similar to motor $D_q$ FIG. 1. The shaft 249b (FIG. 5a) of the housing means $A_q^3$ is connected to a square drive 16a for a fastener socket similar to socket 25 FIG. 1. The effect of centrifugal force on the blade $245b^3$ in this embodiment is eliminated, the blade $245b^3$ being cammed into sealing engagement with the spindle cam $246b^3$ by the spindle cam $246b^3$.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool acts as a seal dynamically and as a valve statically; has all of the advantages of the stall type, clutch type and impact type tools and none of the disadvantages thereof; is lighter in weight and faster in operation than the tools of the stall type and clutch type.

While in accordance with the patent statutes one best known embodiment of and alternative embodiments of the present invention has been illustrated and described in detail, it is to be particularly understood that the invention is not limited thereto or thereby.

I claim:

1. An impulse tool for applying a torque to an object, said impulse tool comprising:
   (a) housing means provided with a cavity for sealingly containing a fluid,
   (b) spindle means in said housing means and in said fluid,
   (c) drive means operatively associated with one of said housing means and said spindle means for causing relative rotary movement between said housing means and said spindle means,
   (d) the other of said housing means and said spindle means being adapted to engage said object,
   (e) one of said housing means and said spindle means being provided with a recess,
   (f) blade means in said recess and pivoted on said one and held in the open unsealingly position by centrifugal force,
   (g) cam means carried by said other and engageable with said blade means, to force said blade means into sealing engagement with said other,
   (h) sealing means on said one,
   (i) said blade means and said other and said other and said sealing means being disposed in sealing relation during a relatively small portion of each revolution of said relative rotary movement,
   (j) said blade means and said other and said other and said sealing means being operable during said relatively small portion of each revolution of said relative rotary movement to dynamically seal off a portion of said cavity so that the pressure in said high pressure portion of the cavity and on said other increases thereby causing the other of said housing means and said spindle means to rotate with respect to said one and to apply a torque to said object.

2. The impulse tool recited in claim 1 wherein said drive means is connected to said housing means.

3. The impulse tool recited in claim 1 wherein said drive means is connected to said spindle means.

4. The impulse tool recited in claim 1 wherein said recess is in said housing means.

5. The impulse tool recited in claim 1 wherein said recess is in said spindle means.

6. The impulse tool recited in claim 1 wherein said cam means is on said housing means.

7. The impulse tool recited in claim 1 wherein said cam means is on said spindle means.

8. The impulse tool recited in claim 1 wherein said sealing means is on said housing means.

9. The impulse tool recited in claim 1 wherein said sealing means is on said spindle means.

10. An impulse tool for applying a torque to an object, said impulse tool comprising:
 (a) housing means provided with a cavity for sealingly containing a fluid and a recess,
 (b) hollow blade means keyed to and reciprocable in said cavity and provided with lug means,
 (c) spindle means in said cavity and in said fluid and in said hollow blade means,
 (d) drive means operatively associated with one of said housing means and said spindle means for causing relative rotary movement between said housing means and said spindle means,
 (e) the other of said housing means and said spindle means being adapted to engage said object,
 (f) sealing means on said spindle means and engageable with said hollow blade means to force said sealing means into engagement with said lug means and said hollow blade means into said recess,
 (g) cam means carried by said spindle means,
 (h) said lug means and said sealing means and said cam means and said housing means being disposed in sealing relation during a relatively small portion of each revolution of said relative rotary movement,
 (i) said lug means and said sealing means and said cam means and said housing means being operable during said relatively small portion of each revolution of said relative rotary movement to dynamically seal off a portion of said cavity so that the pressure in said high pressure portion of the cavity and on said other increases thereby causing the other of said housing means and said spindle means to rotate with respect to said one and to apply a torque to said object.

11. The impulse tool recited in claim 10 wherein said drive means is connected to said housing means.

12. The impulse tool recited in claim 10 wherein said drive means is connected to said spindle means.

References Cited by the Examiner

UNITED STATES PATENTS

| | | | |
|---|---|---|---|
| 1,145,464 | 7/15 | Benson et al. | 192—58 |
| 1,741,524 | 12/29 | Kreher | 192—58 |
| 1,797,472 | 3/31 | King | 192—58 |
| 3,116,617 | 1/64 | Skoog | 64—26 |

BROUGHTON G. DURHAM, *Primary Examiner.*

FRANK SUSKO, *Examiner.*